United States Patent [19]
Iwane

[11] Patent Number: 5,787,314
[45] Date of Patent: Jul. 28, 1998

[54] AUTOMATIC FOCUSING DEVICE

[75] Inventor: Toru Iwane, Tokyo, Japan

[73] Assignee: Nikon Corporation, Tokyo, Japan

[21] Appl. No.: 754,789

[22] Filed: Nov. 21, 1996

[30] Foreign Application Priority Data

Dec. 7, 1995 [JP] Japan .................. 7-318818

[51] Int. Cl.$^6$ .................. G03B 13/34; G03B 15/16
[52] U.S. Cl. .................. 396/95
[58] Field of Search .................. 396/95, 121, 123, 396/153, 122, 89; 250/201.2

[56] References Cited

U.S. PATENT DOCUMENTS

| | | | |
|---|---|---|---|
| 4,812,636 | 3/1989 | Kusaka et al. | 250/201 |
| 5,138,356 | 8/1992 | Nakamura et al. | 354/402 |
| 5,140,359 | 8/1992 | Higashihara et al. | 354/402 |
| 5,434,638 | 7/1995 | Ishibashi et al. | 354/400 |
| 5,457,513 | 10/1995 | Uenaka | 354/400 |
| 5,517,274 | 5/1996 | Hamada et al. | 354/402 |
| 5,585,883 | 12/1996 | Yamano | 396/91 |
| 5,587,762 | 12/1996 | Watanabe | 396/95 |
| 5,612,761 | 3/1997 | Nakata | 396/95 |

FOREIGN PATENT DOCUMENTS

0 404 523  12/1990  European Pat. Off. .
1-288816  11/1989  Japan .

Primary Examiner—Safet Metjahic
Assistant Examiner—Eric Nelson
Attorney, Agent, or Firm—Oliff & Berridge, PLC

[57] ABSTRACT

An automatic focusing device includes a focus detection device for detecting focus data from a plurality of focus detection areas established in the imaging region. A selection device selects a specified area from the plurality of focus detection areas. A focus control device performs focus control of the photographic lens corresponding to the focus data of that specified area. The selection device may include a statistical prediction device for performing a statistical calculation on the past focus data in the specified area and for determining a predicted value of the focus data by extending a trend of the focus data. A statistical determination device determines whether the most recent focus data of the specified area is outside the acceptable range of the predicted value. A statistical tracking device searches for focus data within the acceptable range of the said prediction value and changes the specified area to the searched-out area.

14 Claims, 7 Drawing Sheets

FIG.5a (WHEN ERROR DISPERSION $\sigma^2$ IS SMALL)

FIG.5b (WHEN ERROR DISPERSION $\sigma^2$ IS LARGER)

AUTOMATIC FOCUSING DEVICE

BACKGROUND OF THE INVENTION

1. Field of the Invention

This invention relates to an automatic focusing device that performs automatic control during focusing. More particularly, this invention relates to an automatic focusing device in which a plurality of focus detection areas within the imaging region perform automatic control during focusing while tracking an object as it moves horizontally and vertically within the imaging region.

2. Description of Related Art

In conventional optical devices such as cameras or photographic lenses, an automatic focusing device automatically adjusts focussing of the photographic lens.

In these automatic focusing devices, a focus detection area is provided at the center of the imaging region so that during image formation the defocus amount, image plane position, image plane velocity, contrast or other focus state data can be detected. Based on this detected focus data, the photographic lens is moved to a focused position to perform automatic focusing.

However, when an object is moving away from or toward the camera, a linear prediction is made based on two or three prior focus data. Focus adjustment can then be performed by automatically utilizing the predicted focus data thereby focusing on the object at the position at the time of exposure.

As the object moves vertically/horizontally in front of the camera or moves toward and away from an overlooking camera, the object image moves vertically and horizontally within the imaging region and thus out of the focus detection area. Thus, obtaining interim focus data of the object image can not be achieved. Also, continuity of focus data within the focus detection area is lost. Because of this, the prediction values are widely separated when a linear prediction is formed from the fluctuation of focus data employing past focus data. Accordingly, focusing takes place at a completely different area.

For example, Japan Laid-Open Patent No. 1-288816 discloses an automatic focussing device having a plurality of focus detection areas within the imaging region matching the vertical and horizontal movement of the object within the imaging region and in which the focus detection areas are automatically switched.

Figure 6:
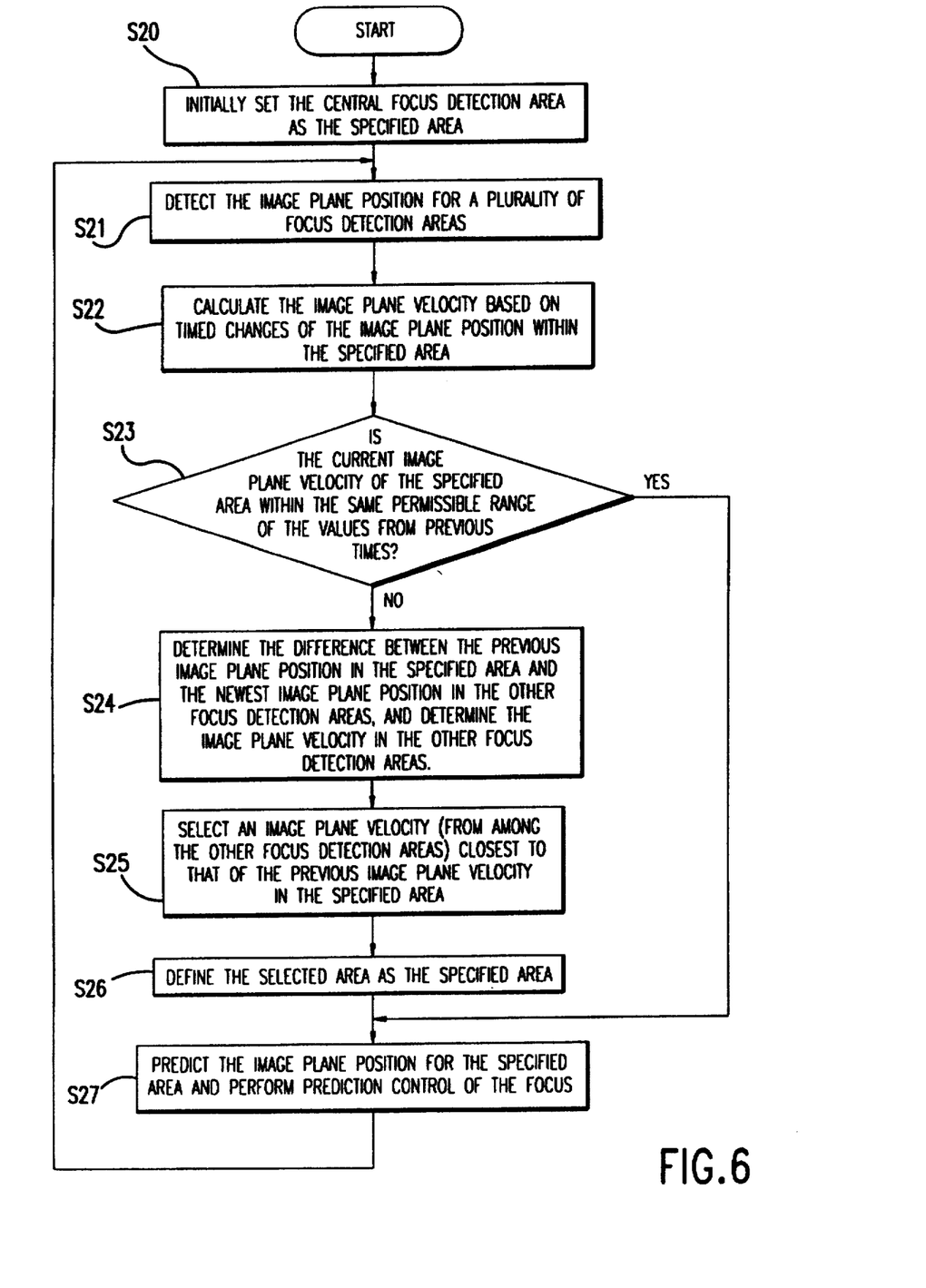
FIG. 6 explains the operation of a conventional automatic focusing device.

FIG. 6 outlines the operation of this type of automatic focusing device. First, in step S20 the automatic focusing device initially sets the focus detection area at a home position used for focus control. For example, the home position of the focus detection area may be at the center of the imaging region.

Next, in step S21 the automatic focusing device calculates a defocus amount for each focus detection area. The defocus amount is the interval between the object image plane and the pictured imaging plane. The image plane position is detected for each focus detection area by adding the lens position of the photographic lens respectively to these defocus amounts.

The image plane velocity of the object image positioned in the specified area is calculated in step S22 based on the changes in time between a previous image plane position and the current image plane position.

When the current image plane velocity is in the same acceptable range as the previous image plane velocity in step S23, the automatic focusing device determines whether the object image positioned within the specified area will continue to be positioned within the specified area based on a continuous image plane velocity.

From this, in step S27 the automatic focusing device predicts the fluctuations in the image plane position for this specified area and performs predictive focus control.

When the current image plane velocity does not fall within an acceptable range based on the previous image plane velocities in step S23, the automatic focusing device determines that the object image has moved outside of the specified area.

The automatic focusing device then calculates the image plane velocity determined by the difference of the most previous image plane position in the specified area positions and the newest image plane position in the other focus detection areas in step S24.

The image plane velocity is the hypothetical image plane velocity in which the object image previously positioned in the specified area has moved into another focus detection area.

In step S25, the automatic focusing device selects the closest previous image plane velocity in the specified area from among the other image plane velocities. The chosen area can be determined before movement of the object image that is positioned within the specified area. As a result, the specified area can be set from this time onward in step S26. The automatic focusing device then performs predictive focus control for the specified area in step S27.

By repeating these operations, focus control can be continuously conducted while automatically switching the focus detection areas in response to the position of the object image moving within the imaging region.

In this type of conventional device, the image formation plane is curved at the center of the imaging region and at the periphery due to aberrations (image plane curvature) occurring in the photographic lens. Because of this, when the image plane velocities are directly calculated from image plane positions extended over a plurality of focus detection areas, the velocity of motion of the object and the image plane velocity do not correspond to each other because of the image plane curvature. This dispersion in the image plane velocity fluctuates due to the different types of photographic lens or due to the object range.

Figure 7:
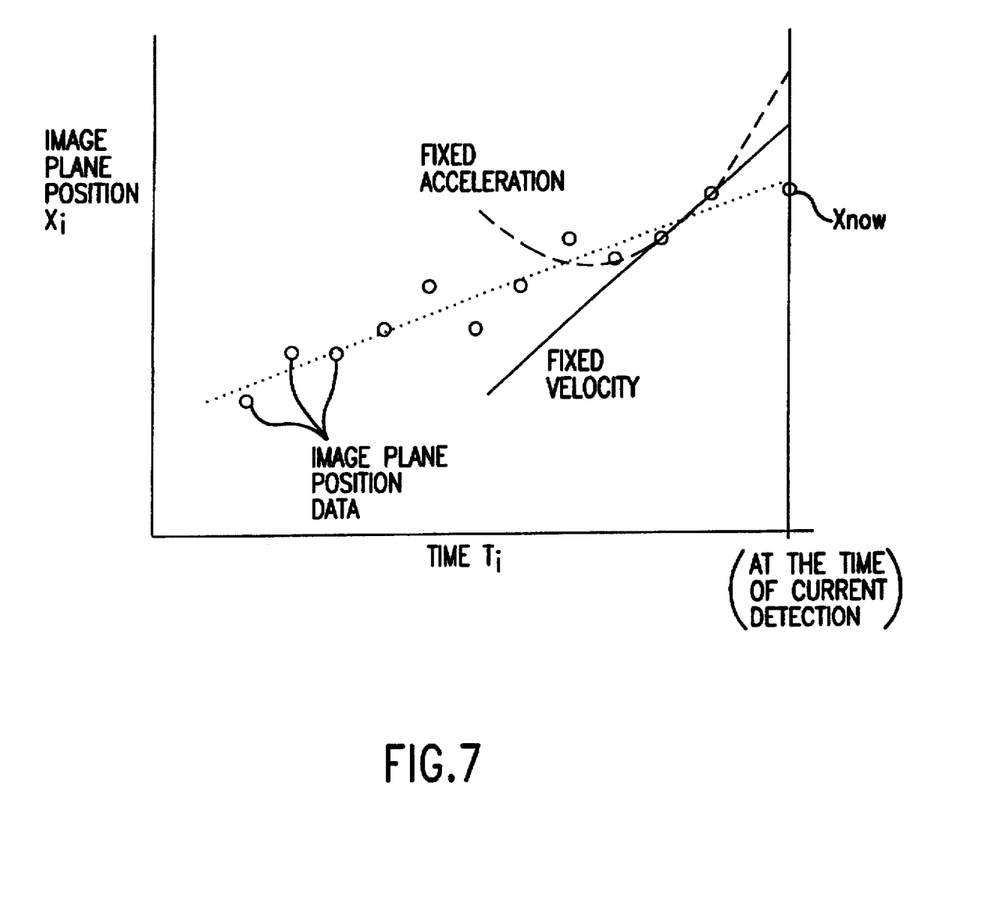
FIG. 7 shows conventional prediction of the image plane position.

Moreover, quantum conversion errors and other errors have been included in the detection value of the image plane position so that a considerable amount of fluctuation occurs in the detection value. FIG. 7 shows these disparities.

For example, when the image plane velocity is determined by extending the line that passes near a couple of previous image plane positions, prediction results can diverge widely from the actual value. If the diverged image plane velocity is made the standard, the continuous image plane velocity can not be accurately performed.

In FIG. 7, the image plane position "X now" is obtained by the current detection despite being positioned in the neighborhood of the center line through the past image plane positions (denoted as a dotted line) without a large divergence, and thereby becomes separated from the straight line extending through the most current two or three data positions with a fixed velocity (denoted as a solid line) or from the curved line extending through the current two or three position data with a fixed acceleration (denoted as a broken line). As a result, the error determination having a discontinuously charged image plane velocity occurs to create a problem.

In order to accurately prevent this type of error determination, the continuous image plane velocity must be extremely broad presenting a problem in that the movement of the object image cannot be sensitively detected.

SUMMARY OF THE INVENTION

In order to solve these and other problems, it is an object of the present invention to present an automatic focusing device that can accurately switch focus detection areas despite fluctuations in focus data such as image plane position, image plane velocity or other focus data.

It is also an object to present an automatic focusing device in which the direction of movement of the focus data can be accurately and easily understood by the device despite focus data fluctuation.

It is a further object to present an automatic focusing device that correctly decides on an acceptable range when determining that the focus data is continuous.

The automatic focusing device may employ preferable focus data in order to fully understand the movement of the object image moving within the imaging region.

The automatic focusing device may be provided with a focus detection device that detects photographic lens focus data from a plurality of focus detection areas within an imaging region. A selection device selects the specified area from a plurality of focus detection areas. A focus control device collects focus data from within the selected specified area and performs focus control of the photographic lens. The selection device is provided with a statistical prediction device for performing a statistical calculation on the past focus data and for determining the predicted value of the focus data extended out in the direction of movement of the determined focus data. A statistical determination device determines a "no-continuity" reading when the most recent focus data within the specified area falls outside of the acceptable range of predicted values. A statistical tracking device searches from among the focus detection areas for the "newest focus data" within an acceptable range of predicted values when a "no continuity" reading is determined by the statistical determination device. The statistical tracking device changes the focus detection area into the specified area.

The statistical prediction device is provided with a regression analysis device that performs regression analysis for the past focus data within the specified area and specifies the smallest predicted function of the average square of error. The predicted value calculation device calculates the predicted value of the focus data employing the prediction function specified through the regression analysis device.

A range setting device may calculate the error dispersion for the past focus data within the specified area and set the value for the acceptable range in the statistical determination device and the statistical tracking device corresponding to that dispersion.

Focus data detected by the focus detection device includes at least one of object image contrast, image plane position, image plane velocity or a defocus amount.

The statistical prediction device performs statistical calculations on the past focus data in the specified area.

The direction of movement of the focus data can be statistically determined using statistical calculations on past focus data despite fluctuations in focus data. The predicted focus data value can be determined by extending the direction of movement of this focus data.

The statistical determination device takes in the most recent focus data within the specified area and determines whether the most recent focus data is outside the acceptable range of the predicted values.

If the determination results represents that the most recent focus data is within an acceptable range, the focus data changes continuously and the object image positioned in the specified area is estimated as the same object as before.

On the other hand, if the most recent focus data is outside of the acceptable range, the focus data does not change continuously so that an estimation is made that the object image has moved into another area.

When a determination is made using the statistical determination device of "no continuity", the statistical tracking device searches for the "most recent focus data" falling within the acceptable range of prediction values that were predicted using the statistical prediction device and changes the searched-out area into the specified area.

A regression analysis device may perform regression analysis for the past focus data in the specified area and specify the smallest prediction function of the mean square of error.

A prediction function determined in this way can display the direction of movement of the focus data despite fluctuations in the focus data.

A prediction value calculation device uses these predicted functions to calculate the prediction value of the most recent focus data.

The statistical determination device and the statistical tracking device select the specified area based on the predicted value.

A range setting device may calculate the error dispersion for the past focus data in the specified area. The error dispersion is the value denoting the degree of scattering of the focus data. The likelihood of the predicted value can be estimated from the error dispersion.

A statistical determination device and statistical tracking device can be set within an acceptable range corresponding to this error dispersion.

As a result of setting the acceptable range corresponding to the error dispersion, when the likelihood of the prediction value is high, the acceptable range is narrowed so that the movement of the object image can be sensitively and accurately determined. If the likelihood of the prediction value is low, the acceptable range is widened to prevent a mistaken determination.

At least one of object image contrast, image plane position, image plane velocity or a defocus amount may be used as focus data.

The trend of the focus data is found using statistical calculation and the newest focus data is predicted using this trend. Because of this, the newest focus data can be appropriately predicted due to image plane curvature or detection errors.

Accordingly, the focus detection areas can be switched at the proper timing based on these predicted values.

Statistical calculations are performed by regression analysis to change the trend of focus data by various factors (such as time) can be accurately and simply found and the newest focus data can be normally predicted.

Accordingly, focus detection areas can be accurately and simply switched based on these predicted values.

The degree of focus data scattering is determined by calculating the error dispersion.

An acceptable range can be set by determining the predicted values corresponding to this error dispersion.

For example, the acceptable range is narrowed when the degree of focus data scattering is small and the movement of the object image can be sensitively and accurately determined.

The acceptable range is broadened when the degree of focus data scattering is large to prevent an error reading.

At least one of object image contrast, image plane position, image plane velocity or defocus amount can be accurately used as the focus data.

Other objects, advantages and salient features of the invention will become apparent from the detailed description taken in conjunction with the annexed drawings which disclose preferred embodiments of the invention.

BRIEF DESCRIPTION OF THE DRAWINGS

The present invention will be described with reference to the following drawings in which like reference numerals refer to like elements and wherein.

DETAILED DESCRIPTION OF PREFERRED EMBODIMENTS

Figure 2:
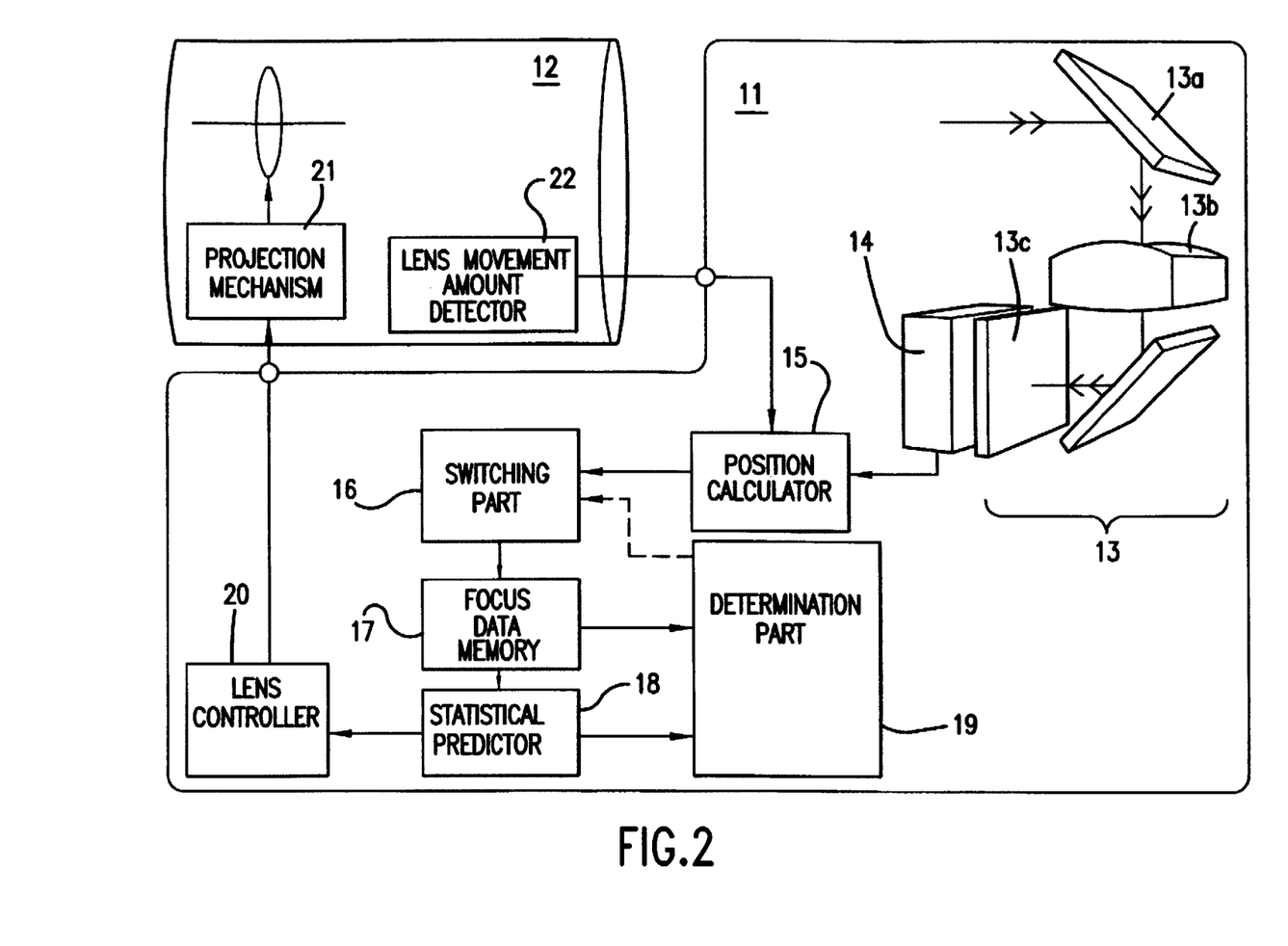
FIG. 2 shows one embodiment of the present invention.
Figure 3:
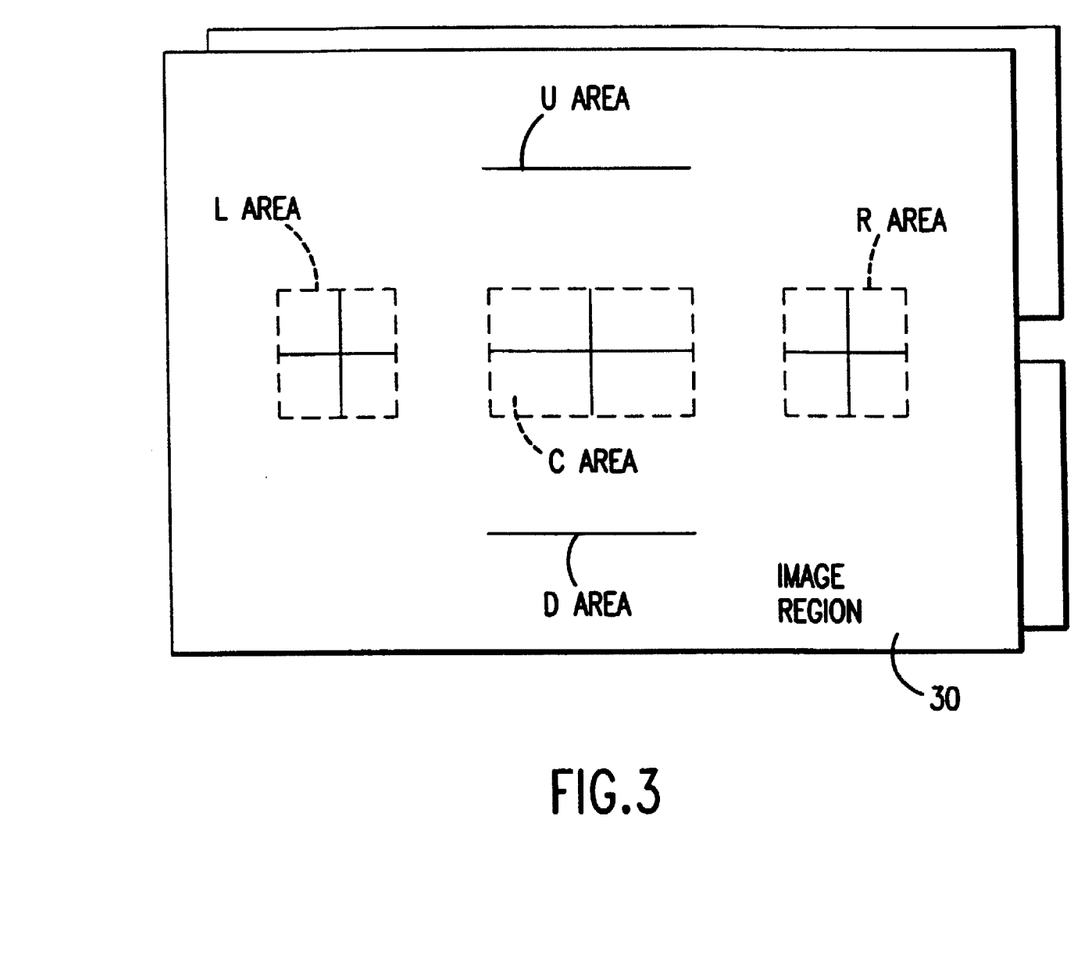
FIG. 3 shows the order of the focus detection areas in one embodiment.

FIG. 2 shows a preferred embodiment of the present invention and FIG. 3 shows an example of the focus detection areas in this preferred embodiment.

Photographic lens 12 is installed onto camera main body 11. A mirror box (not shown) is positioned on the optical axis of photographic lens 12. Focus detection optical system 13 includes sub-mirror 13a, condenser lens 13b and separator lens 13c positioned in the mirror box.

The defocus amount detector 14 is arranged in a position receptive to the light from the focus detection optical system 13. In the defocus amount detector 14, light-receptive elements are positioned corresponding to five focus detection areas such as C area, R area, L area, U area and D area as shown in FIG. 3.

The output of the defocus amount detector 14 is connected to an input of the image plane position calculator 15. An output of lens movement amount detector 22 positioned within the photographic lens 12 is connected to another input of the image plane position calculator 15.

The image plane position calculator 15 is connected to detection area switching part 16, which is connected to focus data memory 17, and eventually to statistical predictor 18. The output of statistical predictor 18 is connected to determination part 19 and lens controller 20. The output of determination part 19 is connected to the control input of detection area switching part 16. The output of lens controller 20 is connected to lens projection mechanism 21 within photographic lens 12.

The respective functions of image plane position calculator 15, detection area switching part 16, statistical predictor 18 and determination part 19 can be accomplished using a single microprocessor installed in camera main body 11.

The focus detection device 1 (FIG. 1) corresponds to focus detection optical system 13, defocus amount detector 14, image plane position calculator 15 and lens movement amount detector 22 (FIG. 2). The focus control device 3 (FIG. 1) includes lens controller 20 and lens projection mechanism 21 (FIG. 2). The statistical prediction device 5 (FIG. 1) includes statistical predictor 18 while the statistical determination device 6 includes the continuity determination function of determination part 19. The statistical tracking device 7 corresponds to the area searching-out function in determination part 19 and to detection area switching part 16.

Figure 1:
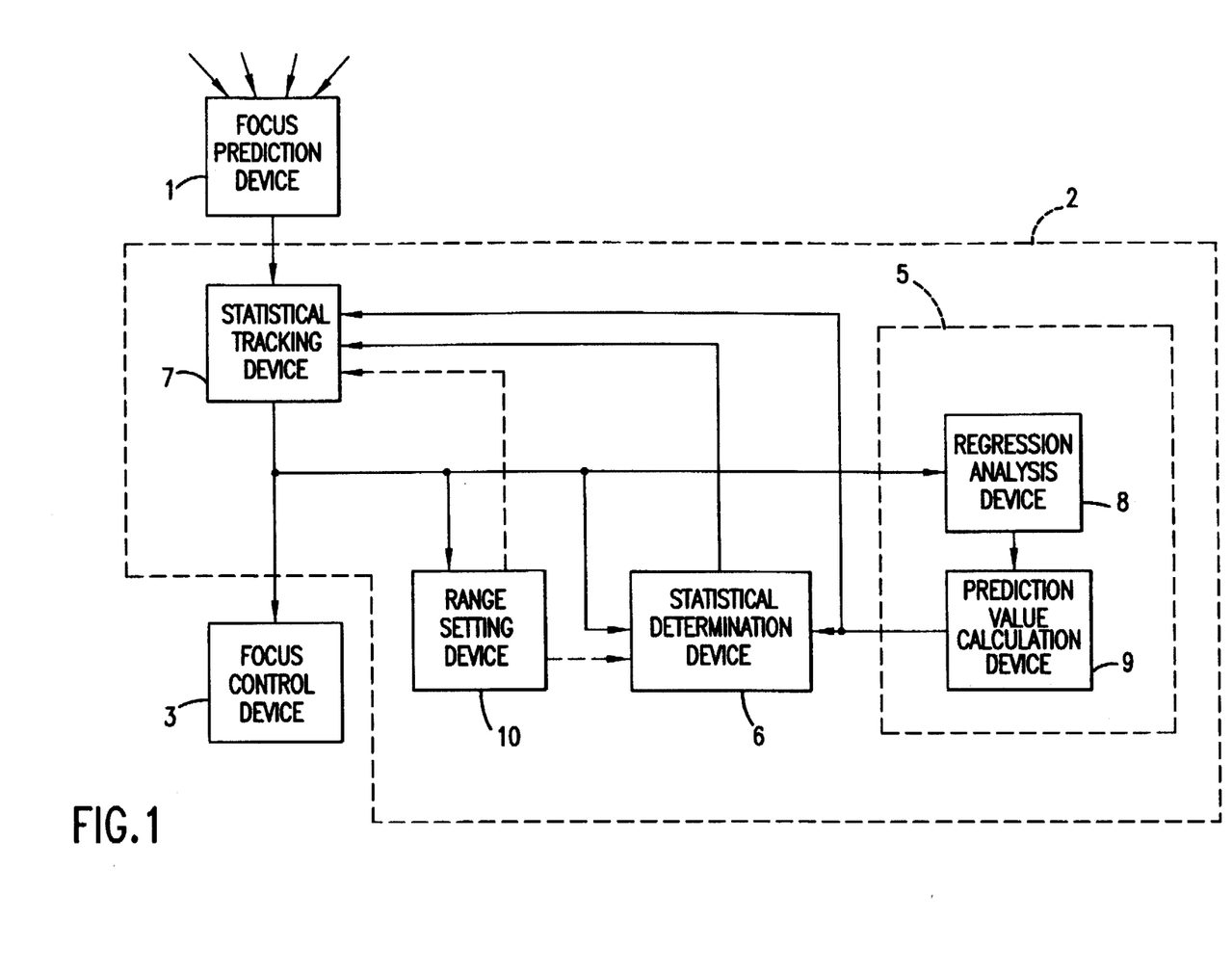
FIG. 1 is a block diagram of the present invention.

Furthermore, regression analysis device 8 and prediction value calculation device 9 correspond to statistical predictor 18. Still further, range setting device 10 corresponds to the acceptable range setting function of determination part 19.

Figure 4:
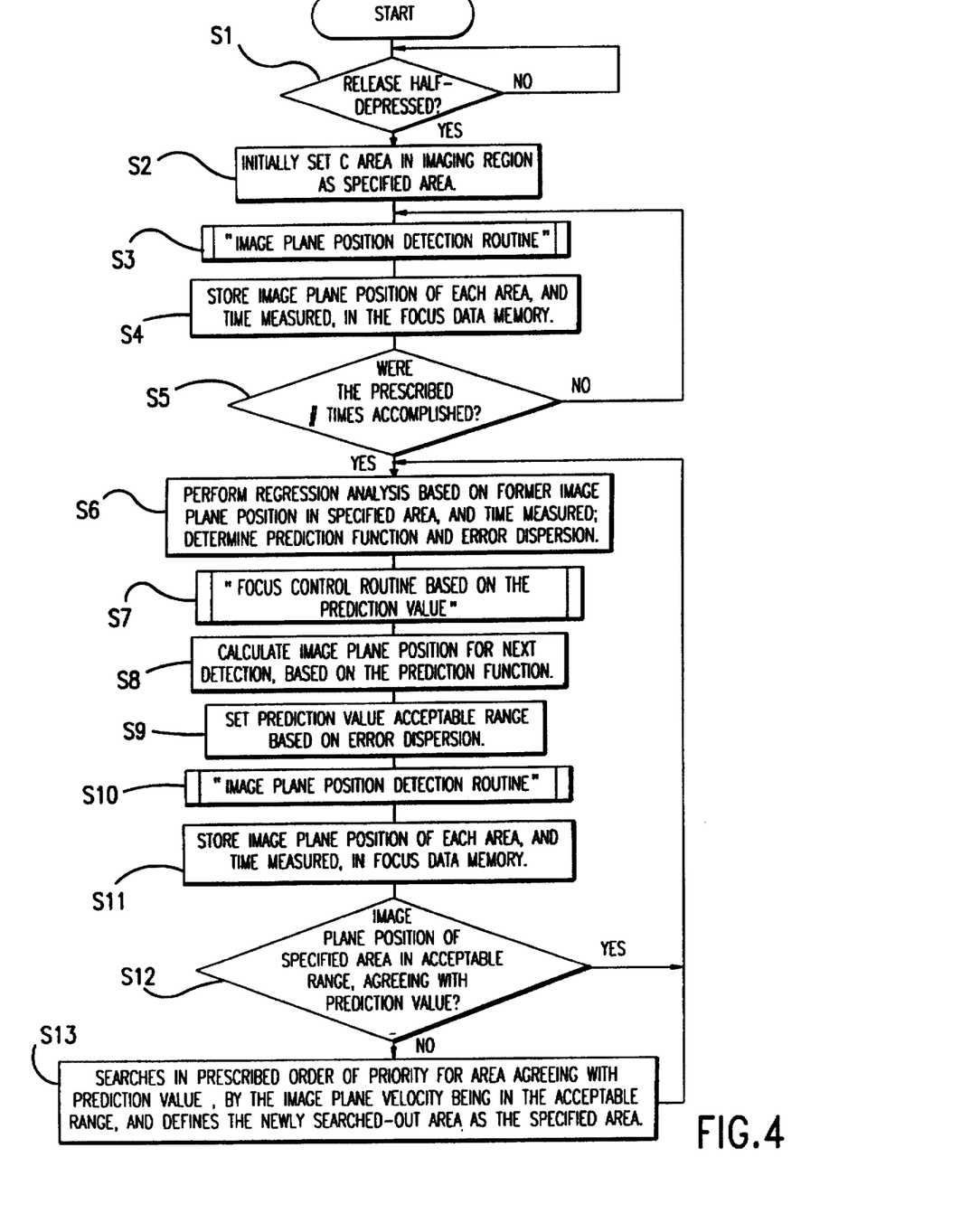
FIG. 4 is a flow chart of one embodiment.

FIG. 4 explains the operation of one preferred embodiment. When the release button of camera main body 11 is half-depressed in step S1, detection area switching part 16 initially sets the C area within imaging region 30 as the specified area in step S2.

The defocus amount detector 14 detects defocus amounts for the five focus detection areas within imaging region 30. The lens movement amount detector 22 detects the lens position. Image plane position calculator 15 adds these defocus amounts and lens positions and calculates the image plane position for each of the five focus detection areas in step S3.

The image plane positions are sequentially stored in the focus data memory 17 along with the measuring time in step S4. Detection area switching part 16 then selects image plane position Xi in the specified area and sequentially stores it in the data region for the specified area established within focus data memory 17.

In order to perform the regression analysis, the measurement and storage of the image plane positions Xi are repeated a number (n) of times as described below.

When the necessary number (n) of samples of image plane positions Xi have been stored in step S5, the statistical predictor 18 takes in the image plane positions Xi and measuring times Ti to perform regression analysis.

First, the average value Xav of the image plane positions Xi and the average value Tav of the measuring times Ti are calculated as follows:

$$Xav = \frac{1}{n} \sum_{i}^{n} Xi \qquad (1)$$

$$Tav = \frac{1}{n} \sum_{i}^{n} Ti \qquad (2)$$

Using the average values Xav and Tav, the products Stt and Sxt are then calculated as follows:

$$Stt = \sum_{i}^{n} (Ti - Tav)^2 \qquad (3)$$

$$Sxt = \sum_{i}^{n} (Xi - Xav)(Ti - Tav) \qquad (4)$$

Then, the slope L and intercept B in the prediction function (X(t)=L·t+B) is determined as follows:

$$L = Sxt/Stt \qquad (5)$$

$$B = Xav - L \cdot Tav \qquad (6)$$

The average of the square values of the error between prediction function X(t) and image plane position Xi is then calculated in step S6 to define the error dispersion $\sigma^2$ as follows:

$$\sigma^2 = \frac{1}{n} \sum_i^n (Xi - X(Ti))^2 \qquad (7)$$

The prediction function X(t) is transmitted to lens controller 20 and utilized in prediction of the image plane position during focus control in step S7.

Figure 5A:
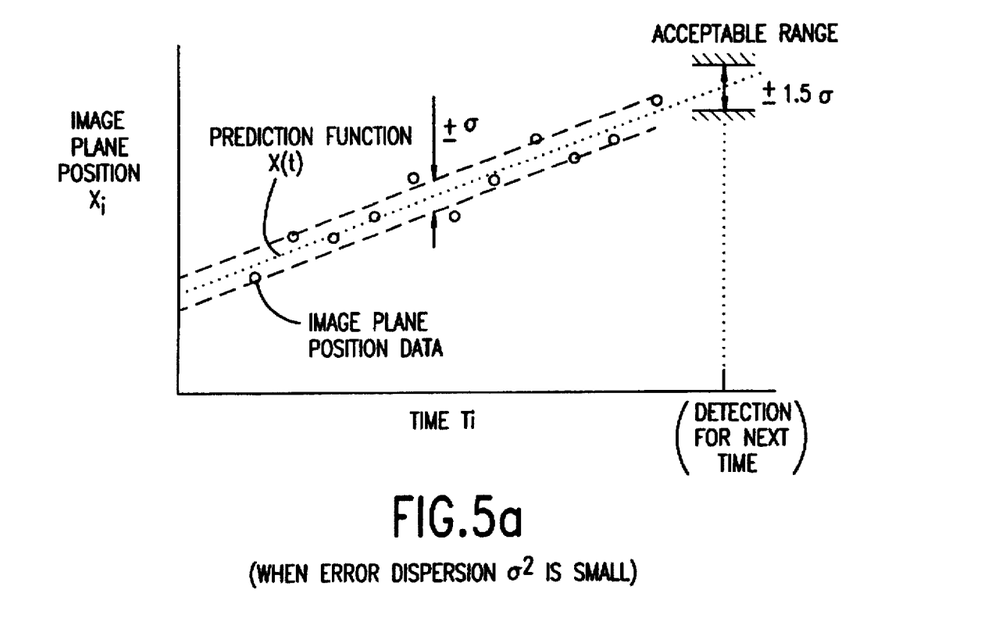
FIG. 5 is one example of the image plane position.
Figure 5B:
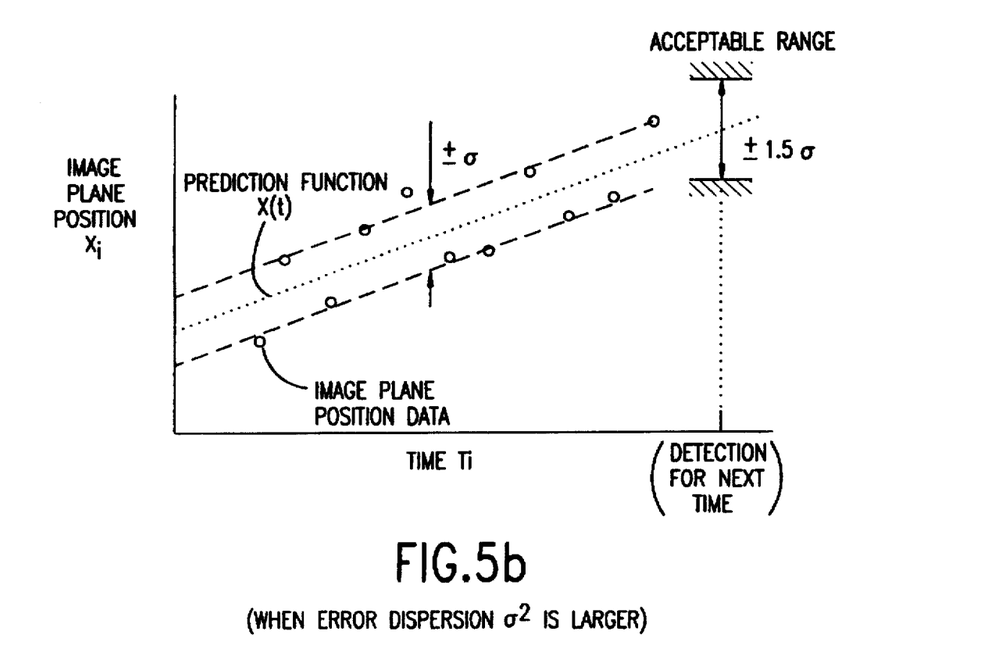

Statistical predictor 18 then determines the predicted value of the image plane position based on this prediction function X (t) in step S8. Moreover, based on the error dispersion $\sigma^2$, the acceptable range of the predicted value is set in step S9. For example, in FIG. 5, the acceptable range is "±1.5σ".

Assuming that the error is in a normal distribution, there is an 87% probability that the image plane position Xi at the next detection will enter this acceptable range.

Under these conditions, the defocus amount detector 14 detects the defocus amounts for the five focus detection areas within imaging region 30. The lens movement amount detector within photographic lens 12 detects the lens position. Image plane position calculator 15 then adds these defocus amounts and lens positions and calculates the image plane positions for each of the five focus detection areas in step S10.

These image plane positions are sequentially stored in focus data memory 17 along with the measuring time in step S11.

Determination part 19 then determines in step S12 whether the most recent image plane position Xi in the specified area falls within the acceptable range of the previously determined prediction value.

When it falls within the acceptable range, the continuity of the image plane position is maintained in the specified area. Thus, the object image within the specified area can be judged as having the same status. From this, detection area switching part 16 stores this most recent image plane position Xi in the specified area and returns to step S6 to repeat the above operation.

On the other hand, if the image plane position does not fall within the acceptable range, the image plane position in the specified area is determined to have changed discontinuously. Then, the object image within the specified area can be judged as to have moved into another area within the imaging region 30.

From this, determination part 19 searches for the most recent image plane position within the acceptable range according to a predetermined order of priority.

In step S13, the detection area switching part 16 sets the very first focus detection area searched as the specified area from this time onward, stores "the most recent focus data" of the new specified area in the specified area data region and returns to step S6 to repeat the above operation.

In this embodiment, the direction of movement of the focus data becomes simpler and can be accurately shown through statistical calculation such as regression analysis. Thus, the most recent focus data can be predicted despite focus data fluctuation.

Moreover, the acceptable range of prediction values is determined corresponding to the error dispersion $\sigma^2$ with the result that an acceptable range corresponding to the degree of error scattering can be accurately determined.

However, when the destination of the moving object can not be searched out, it is desirable that the specified area not be changed and the data of focus data memory 17 not be renewed because an obstacle could pass before the photographing object.

If the destination of the moving object can not be tracked for more than a fixed number of times, it is desirable to reset the focus data memory 17 and to return to step S2 since the object of the photographic subject was moved without continuity and tracking of the movement of the object image could not be accomplished.

Although the image plane position is used as the focus data in the above-described embodiment, this is not limiting. Generally, data relating to the focus state may be used such as object image contrast, image plane position, image plane velocity or the defocus amount.

In the above embodiment, the function X(t) and time (t) are used as input variables in the prediction function for the regression analysis. However, the invention is not limited to this. Rather, any prediction functions can be used as long as the input variables have a correlation with the focus data. Further, there may be more than two types of input variables. In such a case, multiple regression analysis may be used.

Furthermore, a linear function is used as a prediction function for regression analysis. However, the invention is not limited to this. Generally, a prescribed function is assured and a parameter is specified for obtaining the smallest value of the square of error with the result that various functions may be used as the prediction function such as quadratic functions and exponential functions.

Moreover, regression analysis is generally used for statistical calculations. However, the tendency of the focus data may be determined with the detection values of the focus data as the sample data with the result that statistical calculations may be utilized such as a moving average or an auto regressive statistical calculation.

While the invention has been described with reference to specific embodiments, other alternatives, modifications and variations will be apparent to those skilled in the art. That is, the preferred embodiments of the present invention are intended to be illustrative and not limiting. Various changes may be made without departing from the scope of the invention as defined in the following claims.

What is claimed is:

1. An automatic focusing device comprising:
   focus detection means for detecting focus data of a photographic lens from a plurality of focus detection areas established within an imaging region;
   selection means for selecting a specified focus area from said plurality of focus detection areas; and
   focus control means for receiving focus data from the specified area selected by the selection means and for performing focus control of the photographic lens based on the focus data, wherein the selection means comprises:
   statistical prediction means for performing regression analysis on past focus data within said specified focus area and for extending a trend of the focus data to determine an acceptable range of predicted values of the focus data,
   statistical determination means for determining no continuity of focus data when the most recent focus data for the specified focus area falls outside of the acceptable range of predicted values, and
   statistical tracking means for searching for the newest focus data that falls within the acceptable range of predicted values from among the focus detection areas when the statistical determination means determines that there is no continuity of focus data and for setting the searched-out area as the specified area.

2. The automatic focusing device of claim 1, wherein the statistical prediction means for performing regression analysis on past focus data within said specified focus area further comprises:

regression analysis means for specifying a prediction function that minimizes an average of a square of error, and prediction value calculation means for calculating the predicted value of the focus data using the prediction function specified by the regression analysis means.

3. The automatic focusing device of claim 1, further comprising range setting means for calculating an error dispersion for the past focus data within said specified focus area and for setting the acceptable range based on the error dispersion.

4. The automatic focusing device of claim 3, wherein the focus data detected by the focus detection means includes at least one of contrast of object image, image plane position, image plane velocity and a defocus amount.

5. The automatic focusing device of claim 2, further comprising range setting means for calculating an error dispersion for the past focus data within said specified focus area and for setting the acceptable range based on the error dispersion.

6. The automatic focusing device of claim 5, wherein the focus data detected by the focus detection means includes at least one of contrast of object image, image plane position, image plane velocity and a defocus amount.

7. The automatic focusing device of claim 1, wherein the focus data detected by the focus detection means includes at least one of contrast of object image, image plane position, image plane velocity and a defocus amount.

8. An automatic focusing device comprising:

a focus detection device that detects focus data of a photographic lens from a plurality of focus detection areas within an imaging region;

a selection device that selects a specified area from said plurality of focus detection areas; and a focus control device that receives the focus data of the specified focus area and that performs focus control of the photographic lens based on the focus data, wherein the selection device comprises:

a statistical prediction device that performs regression analysis on past focus data within said specified focus area and that extends a trend of the focus data to determine an acceptable range of predicted values of the focus data, a statistical determination device that determines there is no continuity of focus data when the most recent focus data for the specified focus area falls outside of the acceptable range of predicted values, and a statistical tracking device that searches for the newest focus data that falls within the acceptable range of predicted values from among the focus detection areas when the statistical determination device determines no continuity and for setting the searched-out area as the specified area.

9. The automatic focusing device of claim 8, wherein the statistical prediction device that performs regression analysis on past focus data within a specified focus area further comprises:

a regression analysis device that specifies the predicted function that minimizes an average of a square of error; and a prediction value calculation device that calculates the prediction value of the focus data using the prediction function.

10. The automatic focusing device of claim 8, further comprising a range setting device that calculates an error dispersion for the past focus data within said specified area and for setting the acceptable range based on the error dispersion.

11. The automatic focusing device of claim 10, wherein the focus data detected by the focus detection means includes at least one of contrast of object image, image plane position, image plane velocity and a defocus amount.

12. The automatic focusing device of claim 9, further comprising a range setting device that calculates the error dispersion for the past focus data within said specified focus area and for setting the acceptable range based on the error dispersion.

13. The automatic focusing device of claim 12, wherein the focus data detected by the focus detection means includes at least one of contrast of object image, image plane position, image plane velocity and a defocus amount.

14. The automatic focusing device of claim 8, wherein the focus data detected by the focus detection means includes at least one of contrast of object image, image plane position, image plane velocity and a defocus amount.

* * * * *